United States Patent
Cho et al.

(10) Patent No.: US 8,397,121 B2
(45) Date of Patent: Mar. 12, 2013

(54) DECODING METHOD AND APPARATUS OF RETRANSMISSION COMMUNICATION SYSTEM

(75) Inventors: Seong Chul Cho, Daejeon (KR); Hyung Jin Kim, Daejeon (KR); Gweon Do Jo, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/808,838

(22) PCT Filed: Sep. 11, 2008

(86) PCT No.: PCT/KR2008/005380
§ 371 (c)(1),
(2), (4) Date: Jun. 17, 2010

(87) PCT Pub. No.: WO2009/078551
PCT Pub. Date: Jun. 25, 2009

(65) Prior Publication Data
US 2011/0197103 A1   Aug. 11, 2011

(30) Foreign Application Priority Data
Dec. 17, 2007 (KR) .......... 10-2007-0132814

(51) Int. Cl.
*H03M 13/00* (2006.01)

(52) U.S. Cl. ......... 714/751; 714/794; 714/795; 714/796
(58) Field of Classification Search .......... 714/748, 714/794–796
See application file for complete search history.

(56) References Cited

U.S. PATENT DOCUMENTS

| | | | | |
|---|---|---|---|---|
| 7,685,493 B2 * | 3/2010 | Widdup et al. | ............... | 714/751 |
| 7,764,743 B2 * | 7/2010 | Farag | ............... | 375/265 |
| 7,783,949 B2 * | 8/2010 | Lohr et al. | ............... | 714/751 |
| 7,797,605 B2 * | 9/2010 | Garrett et al. | ............... | 714/748 |
| 7,979,770 B2 * | 7/2011 | Lohr et al. | ............... | 714/751 |
| 2003/0145269 A1 | 7/2003 | Kuo et al. | | |

FOREIGN PATENT DOCUMENTS

| | | |
|---|---|---|
| KR | 1020040006171 | 1/2004 |
| KR | 1020060071089 | 6/2006 |
| KR | 1020070053504 | 5/2007 |
| KR | 1020070091883 | 9/2007 |

* cited by examiner

*Primary Examiner* — Esaw Abraham
(74) *Attorney, Agent, or Firm* — Nelson Mullins Riley & Scarborough LLP; EuiHoon Lee, Esq.

(57) ABSTRACT

A decoding method and apparatus of a retransmission communication system are provided. In the decoding method and apparatus, weights are applied to error data and retransmitted data, and the resulting error data and the resulting retransmitted data are chase-combined. Therefore, it is possible to reduce the coding rate of combined data and enhance the reliability of decoding.

19 Claims, 3 Drawing Sheets

DECODING METHOD AND APPARATUS OF RETRANSMISSION COMMUNICATION SYSTEM

RELATED APPLICATIONS

This application is a 35 U.S.C. §371 national stage filing of PCT Application No. PCT/KR2008/005380 filed on Sep. 11, 2008, which claims priority to, and the benefit of, Korean Patent Application No. 10-2007-0132814 filed on Dec. 17, 2007. The contents of the aforementioned applications are hereby incorporated by reference.

TECHNICAL FIELD

The present invention relates to a decoding method and apparatus of a retransmission communication system, and more particularly, to a decoding method and apparatus of a retransmission communication system, in which a log likelihood ratio (LLR) value of a bit string of initially-transmitted erroneous data and an LLR value of a bit string of retransmitted data are compared, weights are applied to the initially-transmitted data and the retransmitted data according to the results of the comparison, and the resulting initially-transmitted data and the resulting retransmitted data are chase-combined.

The present invention was supported by the IT R&D program of Ministry of Information and Communication(MIC) and Institute for Information Technology Advancement (IITA)[Project No. 2006-S-001-02, Project Title: Development of Adaptive Wireless Access and Transmission Techniques for Fourth-Generation Mobile Communication]

BACKGROUND ART

In a retransmission communication system using a hybrid automatic repeat request (H-ARQ) method, a receiver may issue a request for the retransmission of data to a transmitter by transmitting a negative acknowledgement message if data received from the transmitter is erroneous. The transmitter may retransmit the same data as the data (hereinafter referred to as the initially-transmitted data) initially transmitted by the transmitter to the receiver upon receiving the negative acknowledgement message.

Data transmitted by the transmitter may include a bit string encoded using a predetermined encoding method. The transmitter retransmits data (hereinafter referred to as the retransmitted data) having the same bit string as the initially-transmitted data to the receiver upon receiving the negative acknowledgement message. The receiver combines the initially-transmitted data and the retransmitted data, decodes data obtained by the combination, and determines whether the decoded data is erroneous.

However, if the receiver simply combines the initially-transmitted data and the retransmitted data without preprocessing a bit string of the initially-transmitted data and a bit string of the retransmitted data, the speed of processing or the reliability of decoding may decrease due to an increase in the coding rate of data obtained by the combination.

DISCLOSURE OF INVENTION

Technical Problem

The present invention provides a decoding method and apparatus of a retransmission communication system, which can reduce the coding rate of chase-combined data and improve the reliability of decoding by calculating and comparing a log likelihood ratio (LLR) value of a bit string of initially-transmitted erroneous data and an LLR value of a bit string of retransmitted data, applying weights to the initially-transmitted data and the retransmitted data according to the results of the comparison, and chase-combining the resulting initially-transmitted data and the resulting retransmitted data.

Technical Solution

According to an aspect of the present invention, there is provided a decoding method of a retransmission communication system, the decoding method including storing decoded data as error data if the decoded data is erroneous; receiving retransmitted data corresponding to the decoded data; calculating an LLR value of the error data and an LLR value of the retransmitted data; comparing the LLR value of the error data and the LLR value of the retransmitted data and applying weights to the error data and the retransmitted data according to the results of the comparing; and generating chase-combined data by chase-combining error data and retransmitted data obtained by the applying.

According to another aspect of the present invention, there is provided a decoding apparatus of a retransmission communication system, the decoding apparatus including a memory unit storing decoded data as error data if the decoded data is erroneous; a transmission/reception unit receiving retransmitted data corresponding to the decoded data; an LLR calculation unit calculating an LLR value of the error data and an LLR value of the retransmitted data; a comparison unit comparing the LLR value of the error data and the LLR value of the retransmitted data and applying weights to the error data and the retransmitted data according to the results of the comparison; and a data generation unit generating chase-combined data by chase-combining error data and retransmitted data obtained from the application of the weights by the comparison unit.

Advantageous Effects

According to the present invention, if received data is retransmitted data, the LLR value of existing error data and the LLR value of the retransmitted are calculated and then compared, weights are applied to the error data and the retransmitted data according to the results of the comparison, and the resulting error data and the resulting retransmitted are chase-combined. Therefore, it is possible to reduce the coding rate of combined data and improve the reliability of decoding.

BRIEF DESCRIPTION OF THE DRAWINGS

The above and other features and advantages of the present invention will become more apparent by describing in detail preferred embodiments thereof with reference to the attached drawings in which.

BEST MODE FOR CARRYING OUT THE INVENTION

The present invention will hereinafter be described in detail with reference to the ac-companying drawings in which exemplary embodiments of the invention are shown.

Figure 1:
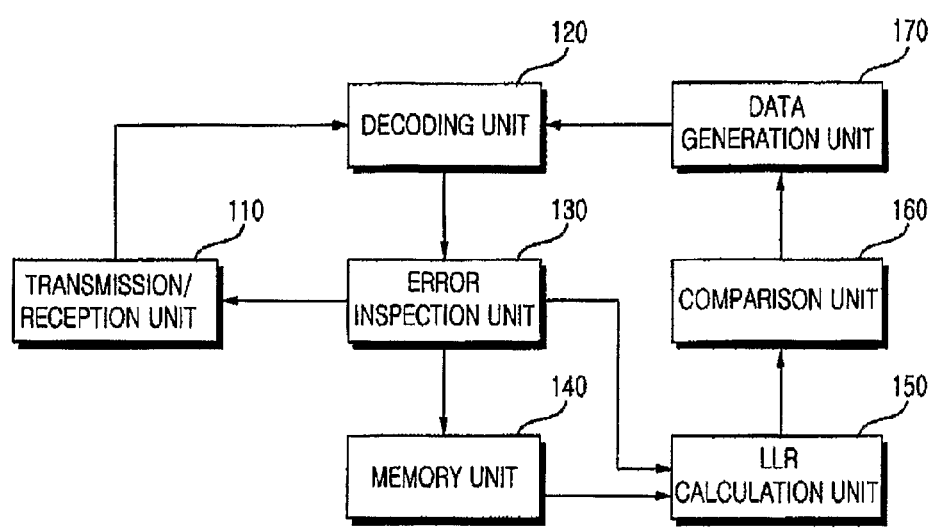
FIG. 1 illustrates a block diagram of a decoding apparatus of a retransmission system according to an embodiment of the present invention.

FIG. 1 illustrates a block diagram of a decoding apparatus 100 of a retransmission communication system according to an embodiment of the present invention. Referring to FIG. 1, the decoding apparatus 100 includes a transmission/reception unit 110, a decoding unit 120, an error inspection unit 130, a memory unit 140, a log likelihood rate (LLR) calculation unit 150, a comparison unit 160 and a data generation unit 170.

The transmission/reception unit 110 exchanges data with a transmitter (not shown). More specifically, the transmission/reception unit 110 may exchange encoded data obtained by using a turbo code as a channel code. Turbo coding is a type of encoding/decoding method that can correct errors in data transmitted in a high-speed data transmission environment. A turbo encoder may include a plurality of configuration encoders and an interleaver connecting the configuration encoders in parallel. If data to be transmitted is N bits long, the first configuration encoder of the turbo encoder may encode the data to be transmitted and transmit the encoded data, the interleaver of the turbo encoder may rearrange N bits in the encoded data, and the second configuration encoder of the turbo encoder may encode the rearranged data and transmit the encoded rearranged data.

The transmission/reception unit 110 receives data (e.g., turbo-coded data) from the transmitter and transmits the received data to the decoding unit 120. The transmission/reception unit 110 may determine whether the received data is initially-transmitted data or retransmitted data. In addition, the transmission/reception unit 110 may determine whether the received data can be decoded by the decoding apparatus 100.

The decoding unit 120 decodes the received data using, for example, a turbo decoder. A turbo decoder may include a plurality of configuration decoders, an interleaver, and a deinterleaver, and may improve the reliability of decoding using an iterative decoding method.

The configuration decoders of a turbo decoder may decode data using a decoding algorithm such as a maximum a posteriori (MAP) algorithm, a log-MAP algorithm, a MAP-log-MAP algorithm, or a soft output viterbi algorithm (SOVA). The MAP algorithm can provide excellent decoding performance but is complicated and difficult to implement as a hardware device. The log-MAP algorithm and the MAP-log-MAP algorithm are less complicated than the MAP algorithm. The SOVA is also less complicated than the MAP algorithm but provides poor decoding performance. Therefore, it is necessary to choose an appropriate decoding algorithm in consideration of the performance of the decoding apparatus 100.

The decoding unit 120 may use a forward error correction (FEC) method to correct errors in data during the decoding of the data. For this, the transmitter may transmit data in addition to additional information for detecting errors from the data.

Decoded data provided by the decoding unit 120 is transmitted to the error inspection unit 130. The error inspection unit 130 determines whether the decoded data is erroneous by using, for example, a cyclic redundancy check (CRC) method. If the results of CRC indicate that the decoded data is erroneous and the decoded data is initially-transmitted data or retransmitted data, a request for the retransmission of data may be issued to the transmitter. On the other hand, if the results of CRC indicate that the decoded data is erroneous and the decoded data is retransmitted data, the LLR value of a bitstream of the retransmitted data may be compared with the LLR value of error data present in the memory unit 140.

The memory unit 140 stores data. More specifically, the memory unit 140 may store error data, which is data determined to be erroneous by the error inspection unit 130. Thus, if data corresponding to the error data is retransmitted by the transmitter, the error data present in the memory unit 140 may be used to lower the coding rate of the retransmitted data.

If data provided by the transmission/reception unit 110 is retransmitted data, the LLR calculation unit 150 may calculate the LLR value of the error data and the LLR value of the retransmitted data in order to lower the coding rate of the retransmitted data and improve the reliability of decoding. More specifically, the LLR calculation unit 150 may calculate the LLR value of a bit string of the error data and the LLR value of a bit string of the retransmitted data.

The comparison unit 160 compares the LLR value of the bit string of the error data and the LLR value of the bit string of the retransmitted data, and determines weights for the bit string of the error data and the bit string of the retransmitted data based on the results of the comparison. Once the weights for the bit string of the error data and the bit string of the retransmitted data are determined, the retransmitted data and the error data are transmitted to the data generation unit 170, and the data generation unit 170 applies the corresponding weights to the bit string of the error data and the bit string of the retransmitted data, and chase-combines the resulting bit strings, thereby lowering the coding rate of the retransmitted data and improving the reliability and the efficiency of decoding.

Chase-combining is retransmission of the same packet as an original packet and can obtain the benefits of increasing reception diversity.

The operation of the decoding apparatus 100 will hereinafter be described in further detail.

The transmission/reception unit 110 receives data and transmits the received data to the decoding unit 120. The transmission/reception unit 110 may determine whether the received data is retransmitted data and whether the received data can be decoded by the decoding apparatus 100.

The decoding unit 120 decodes the data transmitted by the transmission/reception unit 110, and transmits the decoded data to the error inspection unit 130.

The error inspection unit 130 receives the decoded data and determines whether the decoded data is erroneous. If the decoded data is determined not to be erroneous, the decoded data may be transmitted to an upper layer, and the error inspection unit 130 may transmit an acknowledgement message to a transmitter (not shown) through the transmission/reception unit 110 and may thus notify the transmitter that the data transmitted by the transmitter has been successfully received.

On the other hand, if the decoded data is determined to be erroneous, the decoded data may be recognized as error data and may thus be stored in the memory unit 140. The error inspection unit 130 may transmit a negative acknowledgement message to the transmitter through the transmission/reception unit 110. The transmitter may encode the same data as the data initially transmitted by the transmitter and retransmit the encoded data to the transmission/reception unit 110 upon receiving the negative ac-knowledgement message transmitted by the error inspection unit 130.

The transmission/reception unit 110 receives the retransmitted data and transmits the retransmitted data to the decoding unit 120. The decoding unit 120 decodes the re-transmitted data and transmits the decoded retransmitted data to the error inspection unit 130. The error inspection unit 130 determines whether the decoded retransmitted data is erroneous.

If the decoded retransmitted data is determined not to be erroneous, the decoded re-transmitted data may be transmitted to the upper layer, and the transmission/reception unit 110 may transmit an acknowledgement message to the transmitter and may thus notify the transmitter that the retransmitted data has been successfully received.

On the other hand, if the decoded retransmitted data is determined to be erroneous, the decoded retransmitted data may be transmitted to the LLR calculation unit 150. The LLR calculation unit 150 calculates the LLR value of a bit string of the decoded retransmitted data. In addition, the LLR calculation value 150 receives error data present in the memory unit 140 and calculates the LLR value of a bit string of the error data. The LLR values calculated by the LLR calculation value 150 are transmitted to the comparison unit 160.

The comparison unit 160 compares the LLR value of the bit string of the error data and the LLR value of the bit string of the decoded retransmitted data. More specifically, the comparison unit 160 may compare the absolute value of the LLR value of the bit string of the error data and the absolute value of the LLR value of the bit string of the decoded retransmitted data and may apply weights to the bit string of the error data and the bit string of the decoded retransmitted data according to the results of the comparison. The comparison unit 160 may apply a greater weight to whichever of the bit string of the error data and the bit string of the decoded retransmitted data has a greater absolute LLR value. The data generation unit 170 may chase-combine the bit string of the error data and the bit string of the decoded retransmitted data.

The data generation unit 170 may transmit chase-combined data obtained by chase-combining the bit string of the error data and the bit string of the decoded retransmitted data to the decoding unit 120. The decoding unit 120 decodes the chase-combined data. The error inspection unit 130 determines whether the decoded chase-combined data is erroneous. The decoding unit 120 may decode the chase-combined data using a forward error correction method.

If the decoded chase-combined data is determined not to be erroneous, the decoded chase-combined data may be transmitted to the upper layer, and the decoding unit 120 may transmit an acknowledgement message to the transmitter through the transmission/reception unit 11 and may thus notify the transmitter that the retransmitted data has been successfully received and decoded.

On the other hand, if the decoded chase-combined data is determined to be erroneous, the decoded chase-combined data may be stored in the memory unit 140 as new error data, and the transmission/reception unit 11 may transmit a negative ac-knowledgement message to the transmitter and may issue a request for the re-transmission of data corresponding to the chase-combined data to the transmitter.

Figure 2:
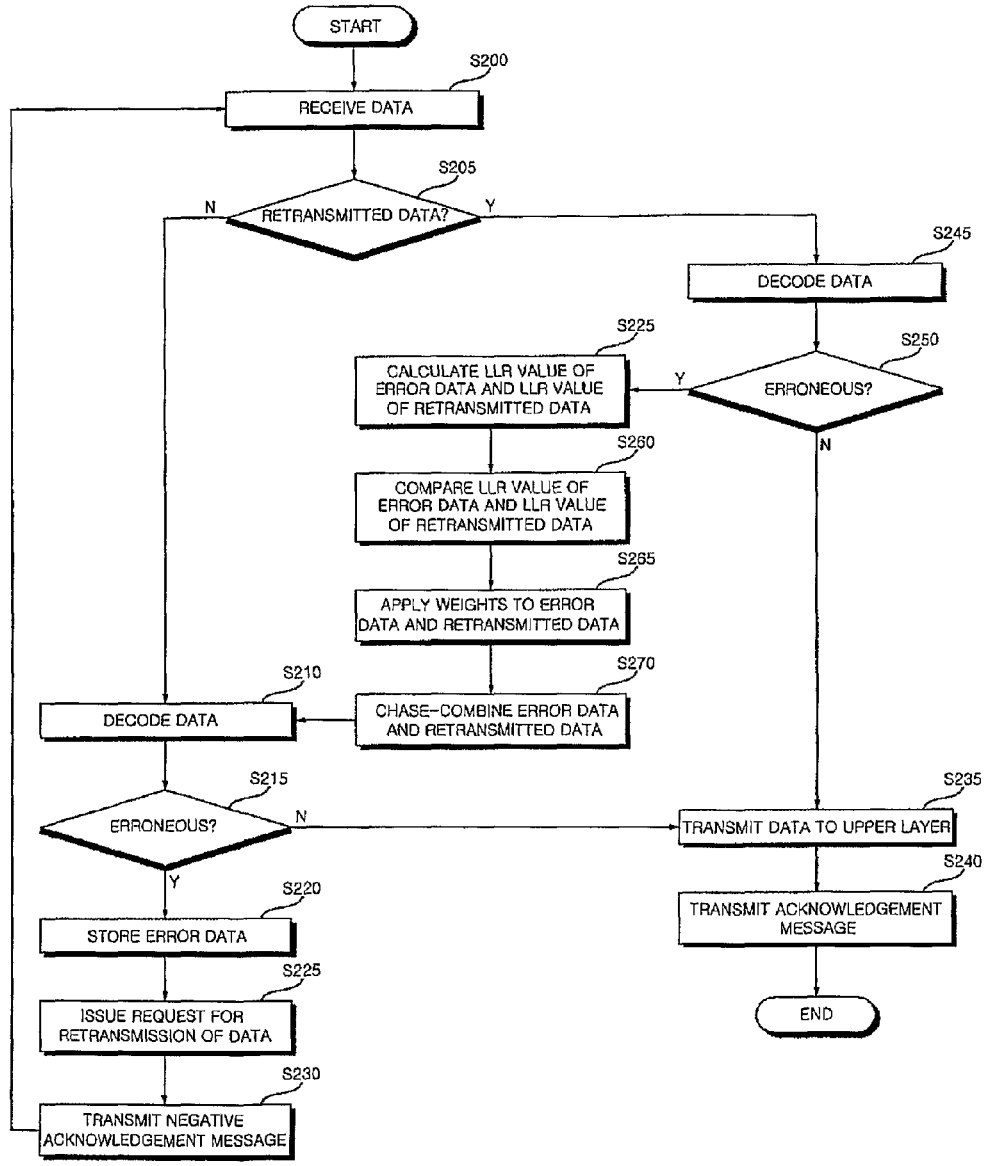
FIG. 2 illustrates a flowchart of a decoding method of a retransmission communication system according to an embodiment of the present invention.

FIG. 2 illustrates a flowchart of a decoding method of a retransmission communication system, according to an embodiment of the present invention. Referring to FIG. 2, the transmission/reception unit 110 receives data transmitted by a transmitter (not shown) (S200).

Thereafter, the transmission/reception unit 110 determines whether the received data is retransmitted data (S205).

If the received data is not retransmitted data, the received data is decoded by the decoding unit 120 (S210). Thereafter, the error inspection unit 130 determines whether the decoded data is erroneous (S215).

If the decoded data is determined to be erroneous (S215), the decoded data is stored in the memory unit 140 as error data (S220). Thereafter, a request for the re-transmission of data is issued to the transmission/reception unit 110 (S225). A negative acknowledgement message indicating that the reception and the decoding of the data transmitted by the transmitter have failed is transmitted to the transmitter (S230).

On the other hand, if the decoded data is determined not to be erroneous (S215), the decoded data is transmitted to an upper layer (S235), and an acknowledgement message indicating that the reception and the decoding of the data transmitted by the transmitter have been successfully performed is transmitted to the transmitter (S240). Then, the decoding method ends.

If the received data is retransmitted data (S205), the retransmitted data is decoded by the decoding unit 120 (S245), and the error inspection unit 130 determines whether the decoded retransmitted data is erroneous (S250).

If the decoded retransmitted data is determined to be erroneous (S250), the LLR calculation unit 150 calculates the LLR value of the error data and the LLR value of the decoded retransmitted data (S255).

Thereafter, the comparison unit 160 compares the LLR value of the error data and the LLR value of the decoded retransmitted data (S260), and applies weights to the error data and the decoded retransmitted data according to the results of the comparison performed in S260 (S265).

Thereafter, the data generation unit 170 chase-combines retransmitted data and error data obtained from the application of the weights, performed in operation S265 (S270). Thereafter, chase-combined data obtained by chase-combining performed in operation S270 is decoded by the decoding unit 120 (S210). The error inspection unit 130 determines whether the decoded chase-combined data is erroneous (S215).

If the decoded chase-combined data is determined to be erroneous (S215), the decoded chase-combined data is stored in the memory unit 140 as new error data (S220). Thereafter, a request for the retransmission of data is issued to the transmission/reception unit 110 (S225), and a negative acknowledgement message indicating that the reception and the decoding of the data retransmitted by the transmitter have failed is transmitted to the transmitter (S230).

On the other hand, if the decoded chase-combined data is determined not to be erroneous (S215), the decoded chase-combined data is transmitted to the upper layer (S235), and an acknowledgement message indicating that the reception and the decoding of the data retransmitted by the transmitter have been successfully performed is transmitted to the transmitter (S240). Then, the decoding method ends.

Figure 3:
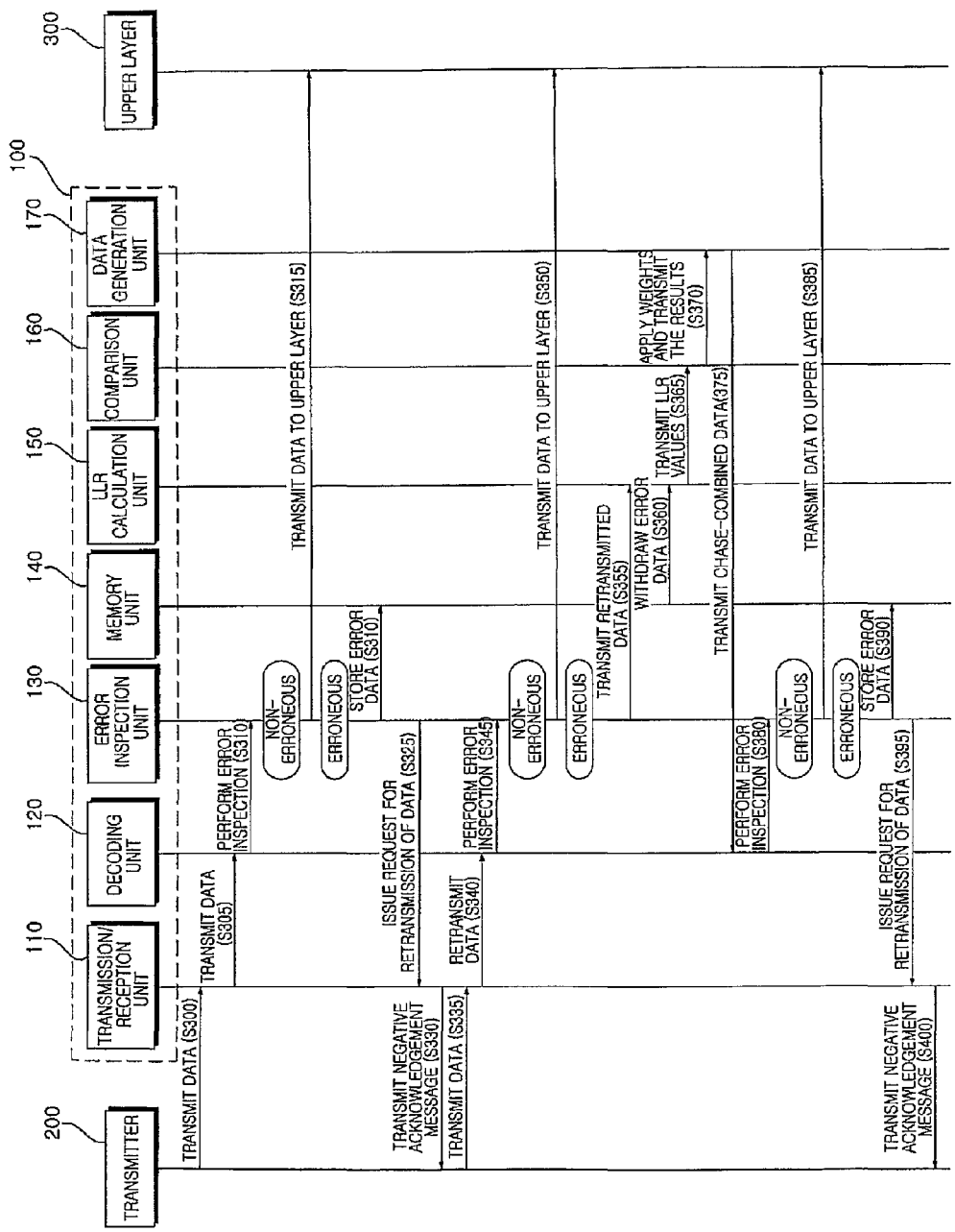
FIG. 3 illustrates a flowchart of the transmission of data as performed in the decoding method shown in FIG. 2.

FIG. 3 illustrates a flowchart of the transmission of data as performed in the decoding method illustrated in FIG. 2. Referring to FIG. 3, a transmitter 200 transmits data, and the transmission/reception unit 110 of the decoding apparatus 100 receives the data transmitted by the transmitter 200 (S300). Thereafter, the transmission/reception unit 110 transmits the received data to the decoding unit 120 (S305).

Thereafter, the decoding unit 120 decodes the data transmitted by the transmission/reception unit 110 and transmits the decoded data to the error inspection unit 130 (S310). Thereafter, the error inspection unit 130 determines whether the decoded data is erroneous.

If the decoded data is erroneous, the decoded data is stored in the memory unit 140 as error data (S320). Thereafter, the error inspection unit 130 issues a request for the retransmission of data to the transmission/reception unit 110 (S325). Then, the transmission/reception unit 110 transmits a negative acknowledgement message to the transmitter 200. The transmitter 220 recognizes that the data transmitted in operation S300 is erroneous upon receiving the negative acknowledgement message transmitted by the transmission/reception unit 110, and retransmits the same data as the data transmitted in operation S300 to the decoding apparatus 100 (S335). The data re-transmitted in operation S335 may have the same bit string as the data transmitted in operation S300.

If the decoded data is not erroneous, the decoded data is transmitted to an upper layer 300 (S315), and an acknowledgement message indicating that the reception and the decoding of the data transmitted in operation S300 have been successfully performed is transmitted.

Thereafter, the data retransmitted in operation S335 is transmitted to and then decoded by the decoding unit 120 (S340). Thereafter, the decoded retransmitted data is transmitted to the error inspection unit 130 (S345). The error inspection unit 130 determines whether the decoded retransmitted data is erroneous.

If the decoded retransmitted data is not erroneous, the decoding apparatus 100 transmits the decoded retransmitted data to the upper layer 300 (S350). On the other hand, if the decoded retransmitted data is erroneous, the decoded retransmitted data is transmitted to the LLR calculation unit 150 (S355). The LLR calculation unit 150 receives the decoded retransmitted data, withdraws the error data present in the memory unit 140 (S360), and calculates the LLR value of the decoded retransmitted data and the LLR value of the withdrawn error data. More specifically, the LLR calculation unit 150 may calculate the LLR value of a bit string of the decoded retransmitted data and the LLR value of a bit string of the withdrawn error data.

The LLR calculation unit 150 transmits the LLR value of the bit string of the decoded retransmitted data and the LLR value of the bit string of the withdrawn error data to the comparison unit 160 (S365). The comparison unit 160 compares the LLR value of the bit string of the decoded retransmitted data and the LLR value of the bit string of the withdrawn error data and applies weights to the bit string of the decoded retransmitted data and the bit string of the withdrawn error data according to the results of the comparison. For example, the comparison unit 160 may apply a greater weight to whichever of the bit string of the withdrawn error data and the bit string of the decoded retransmitted data has a greater LLR value. The comparison unit 160 transmits error data and retransmitted data obtained from the application of the weights to the data generation unit 170 (S370).

The data generation unit 170 chase-combines the error data and the retransmitted data transmitted by the comparison unit 160, thereby generating chase-combined data. The data generation unit 170 may chase-combine the error data and the retransmitted data transmitted by the comparison unit 160 on a bit-by-bit basis. The chase-combined data generated by the data generation unit 170 is transmitted to the decoding unit 120 and is decoded by the decoding unit 120 (S375). The decoding unit 120 transmits the decoded chase-combined data to the error inspection unit 130 (S380). The error inspection unit 130 determines whether the decoded chase-combined data is erroneous.

If the decoded chase-combined data is not erroneous, the error inspection unit 130 transmits the decoded chase-combined data to the upper layer 300 (S385). On the other hand, if the decoded chase-combined data is erroneous, the error inspection unit 130 stores the decoded chase-combined data in the memory unit 140 as new error data (S390), and issues a request for the retransmission of data to the transmission/reception unit 110 (S395). The transmission/reception unit 110 may issue a request for the retransmission of data corresponding to the new error data to the transmitter 200 by transmitting a negative acknowledgement message to the transmitter 200 upon receiving the request issued by the error inspection unit 130.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

Industrial Applicability

According to the present invention, if received data is retransmitted data, weights are applied to error data and the retransmitted data, and the resulting error data and the resulting retransmitted data are chase-combined. Therefore, it is possible to reduce the coding rate of combined data and enhance the reliability of decoding.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A decoding method of a retransmission communication system, the decoding method comprising:
    storing decoded data as error data if the decoded data is erroneous;
    receiving retransmitted data corresponding to the decoded data;
    calculating a log likelihood ratio (LLR) value of the error data and an LLR value of the retransmitted data;
    comparing the LLR value of the error data and the LLR value of the retransmitted data and applying weights to the error data and the retransmitted data according to the results of the comparing step; and
    generating chase-combined data by chase-combining error data and retransmitted data obtained from the application of the weights by the comparing step.

2. The decoding method of claim 1, further comprising decoding the chase-combined data.

3. The decoding method of claim 2, further comprising, if the decoded chase-combined data is erroneous, storing the chase-combined data as new error data.

4. The decoding method of claim 1, wherein the decoded data is obtained by a forward error correction method.

5. The decoding method of claim 1, further comprising determining whether the decoded data is erroneous using a cyclic redundancy check (CRC) method.

6. The decoding method of claim 1, wherein the receiving comprises receiving the retransmitted data using a hybrid automatic repeat request (H-ARQ) method.

7. The decoding method of claim 1, wherein the retransmitted data has the same bit string as the decoded data.

8. The decoding method of claim 1, wherein the applying comprises applying a greater weight to whichever of the error data and the retransmitted data has a greater absolute LLR value.

9. The decoding method of claim 1, wherein the calculating comprises calculating an LLR value of a bit string of the error data and an LLR value of a bit string of the retransmitted data.

10. A decoding apparatus of a retransmission communication system, the decoding apparatus comprising:
- a memory unit storing decoded data as error data if the decoded data is erroneous;
- a transmission/reception unit receiving retransmitted data corresponding to the decoded data;
- an LLR calculation unit calculating an LLR value of the error data and an LLR value of the retransmitted data;
- a comparison unit comparing the LLR value of the error data and the LLR value of the retransmitted data and applying weights to the error data and the retransmitted data according to the results of the comparison unit; and
- a data generation unit generating chase-combined data by chase-combining error data and retransmitted data obtained from the application of the weights by the comparison unit.

11. The decoding apparatus of claim 10, further comprising an error inspection unit which determines whether the decoded data is erroneous and issues a request for the retransmission of the decoded data if the decoded data is erroneous.

12. The decoding apparatus of claim 11, wherein the error inspection unit determines whether the decoded data is erroneous using a CRC method.

13. The decoding apparatus of claim 10, further comprising a decoding unit decoding the chase-combined data.

14. The decoding apparatus of claim 13, wherein, if the decoded chase-combined data is erroneous, the memory unit stores the chase-combined data as new error data.

15. The decoding apparatus of claim 14, wherein the decoding unit uses a forward error correction method.

16. The decoding apparatus of claim 10, wherein the transmission/reception unit receives the retransmitted data using an H-ARQ method.

17. The decoding apparatus of claim 10, wherein the retransmitted data has the same bit string as the decoded data.

18. The decoding apparatus of claim 10, wherein the comparison unit applies a greater weight to whichever of the error data and the retransmitted data has a greater absolute LLR value.

19. The decoding apparatus of claim 10, wherein the LLR calculation unit calculates an LLR value of a bit string of the error data and an LLR value of a bit string of the retransmitted data.

* * * * *